US008056442B2

(12) United States Patent
Ruehle et al.

(10) Patent No.: US 8,056,442 B2
(45) Date of Patent: Nov. 15, 2011

(54) ALL-WHEEL DRIVETRAIN FOR A MOTOR VEHICLE

(75) Inventors: Günter Ruehle, Loechgau (DE); Hans-Peter Nett, Adenau (DE); Tobias Zacher, Muehlberg (DE); Wolfgang Eichhorn, Benningen (DE)

(73) Assignee: GETRAG Getriebe- und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 1061 days.

(21) Appl. No.: 11/875,790

(22) Filed: Oct. 19, 2007

(65) Prior Publication Data

US 2008/0099267 A1 May 1, 2008

(30) Foreign Application Priority Data

Oct. 20, 2006 (DE) ........................ 10 2006 050 972

(51) Int. Cl.
*F16H 37/06* (2006.01)

(52) U.S. Cl. ...................................................... 74/665 F

(58) Field of Classification Search ................. 74/665 F, 74/665 G, 665 GC, 329, 340
See application file for complete search history.

(56) References Cited

U.S. PATENT DOCUMENTS 4,671,377 A 6/1987 Ehrlinger et al.
4,995,862 A 2/1991 Arocha
7,225,695 B2 6/2007 Gumpoltsberger et al.
2003/0111285 A1 6/2003 Gansloser et al.
2004/0093972 A1 * 5/2004 Gumpoltsberger et al. .... 74/325

FOREIGN PATENT DOCUMENTS

| | | | |
|---|---|---|---|
| DE | 1 480 674 | A1 | 5/1969 |
| DE | 35 14 370 | A1 | 11/1985 |
| DE | 102 53 259 | A1 | 5/2004 |
| DE | 103 45 355 | A1 | 5/2005 |
| EP | 1 321 328 | A2 | 6/2003 |
| JP | 63 247 123 | A | 10/1988 |

OTHER PUBLICATIONS

Journal "Automobiltechnische Zeitschrift (ATZ)" issue 2, 2004, vol. 106, pp. 92-98.
Statement of relevance "Automobiltechnische Zeitschrift (ATZ)" issue 2, 2004, vol. 106, pp. 92-98.
European Search Report from European Patent Application No. 07 01 7334, dated Jan. 25, 2010.

* cited by examiner

*Primary Examiner* — Edwin A Young
(74) *Attorney, Agent, or Firm* — Knobbe, Martens, Olson & Bear, LLP

(57) ABSTRACT

An all-wheel drivetrain for a motor vehicle, which has at least two driven axles, comprising a characteristic torque converter transmission of longitudinal construction. To the input side of the transmission drive power is fed and the transmission serves for converting a characteristic of a drive engine. The output side of the transmission is connected to a transfer device, by means of which the drive power can be distributed to the two axles. The transmission has an output shaft which is connected to a first drive shaft for the first axle, and a countershaft parallel thereto. The output shaft and the countershaft are connected to one another by means of a first constant transmission ratio. The countershaft is connected by means of a second constant transmission ratio to a second drive shaft for the second axle. The transfer device is arranged coaxially with the second drive shaft.

13 Claims, 2 Drawing Sheets

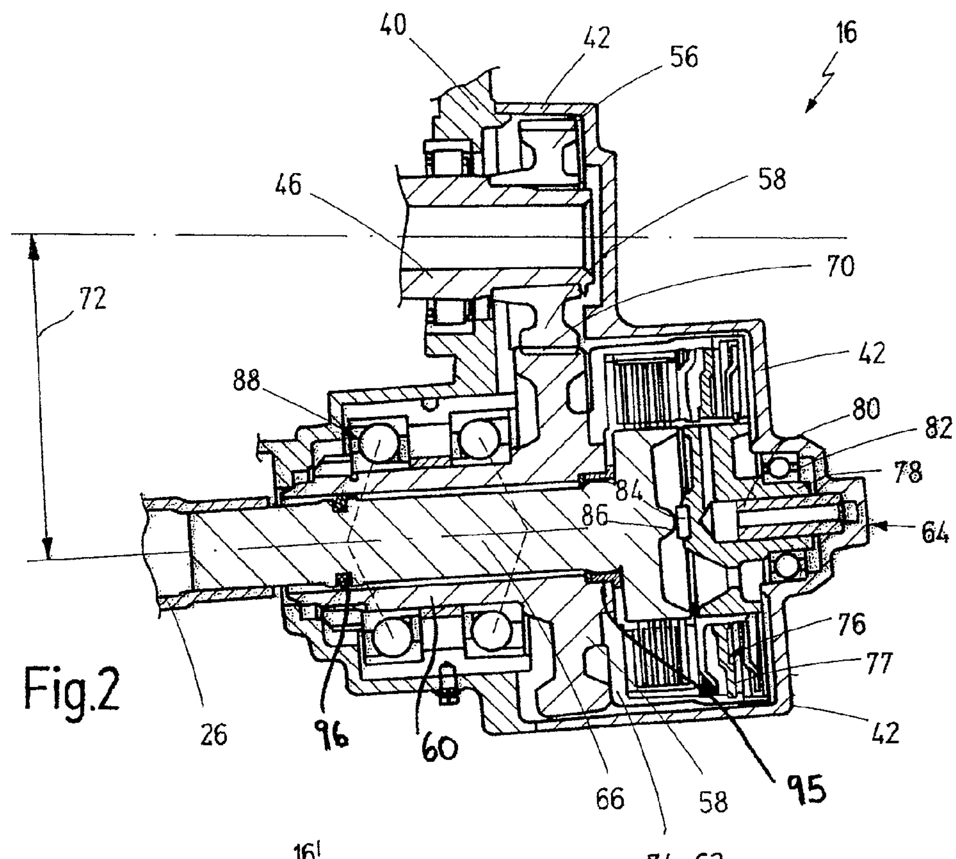
Fig.2
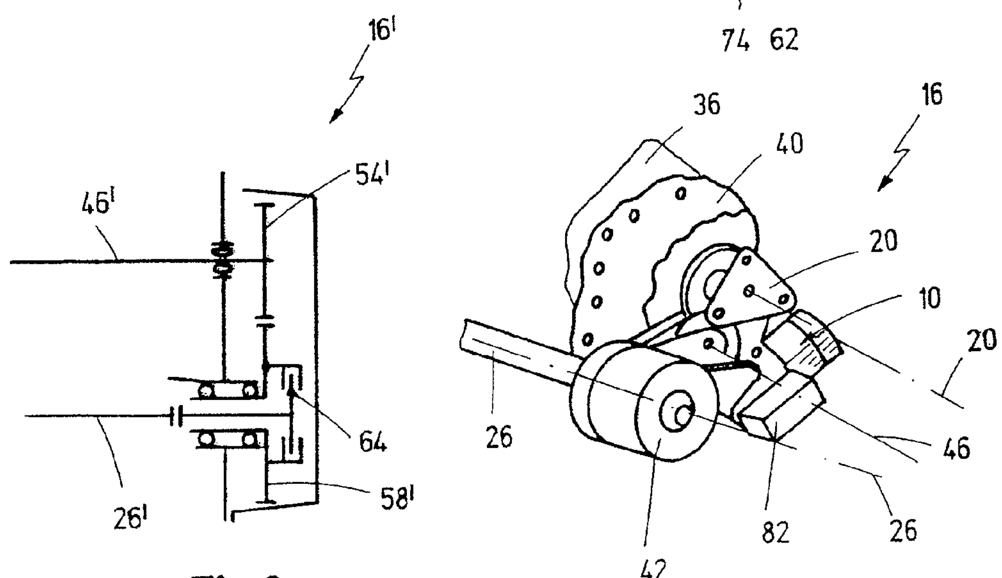
Fig.3
Fig.4

ALL-WHEEL DRIVETRAIN FOR A MOTOR VEHICLE

CROSS-REFERENCE TO RELATED APPLICATIONS

This application claims the priority of German patent application DE 10 2006 050 972.2 filed Oct. 20, 2006.

BACKGROUND OF THE INVENTION

The present invention relates to an all-wheel drivetrain for a motor vehicle, which has at least two driven axles, comprising a characteristic torque converter transmission of longitudinal construction, to the input side of which drive power is fed and which serves for converting a characteristic of a drive engine, and the output side of which is connected to a transfer device, by means of which the drive power can be distributed to the two axles, the characteristic torque converter transmission having an output shaft, which is connected to a first drive shaft for the first axle, and a countershaft parallel thereto, the output shaft and the countershaft being connected to one another by means of a first constant transmission ratio, and the countershaft being connected by means of a second constant transmission ratio to a second drive shaft for the second axle.

Such an all-wheel drivetrain is disclosed by DE 102 53 259 A1.

In the document cited an internal combustion engine is connected to an input of a dual clutch arrangement. The output of the dual clutch arrangement is connected to a dual clutch transmission, which comprises an input shaft arrangement, a countershaft and at least one transmission output, which is not aligned coaxially with the one or more transmission input shafts. The dual clutch transmission is embodied as a countershaft transmission.

In one embodiment, the countershaft is connected to the output shaft by a constant output gear train. The output shaft is connected to a first drive shaft for a rear axle. Also supported on the countershaft is a loose gear, which can be connected to the countershaft by means of a transfer device in the form of a selective engagement clutch. The loose gear meshes with a further gear, which is connected to a second drive shaft for the second axle (front axle). The second drive shaft is connected to a front axle transverse differential.

EP 1 321 327 A2 also discloses a longitudinally installed drivetrain for a motor vehicle, in which a transfer box serves to transmit a drive torque on the one hand to a rear axle and on the other hand to a front axle by way of a prop shaft arranged at an angle to the drivetrain longitudinal axis. In this case power is transmitted from the transfer box to the prop shaft via a drive pinion and an output pinion, a universal joint of the prop shaft being arranged at least partially inside the output pinion.

The intention here is to enhance a motor vehicle transmission designed for a rear wheel drive in such a way as to allow a further output to a front axle differential.

The journal Automobiltechnische Zeitschrift (ATZ), issue 2, 2004, Vol. 106, pages 92 to 98, furthermore discloses the flange mounting of a transfer case having a fixed output to the rear axle on the transmission output of a conventional, manual shift transmission. Also coaxially arranged with the output shaft is a selective engagement clutch, which can be connected to a drive shaft for the front axle by way of a hollow shaft and a chain drive.

Such a separate transfer box involves a great weight and takes up a large overall space. A relatively large number of meshing toothed engagements is also required. The weight distribution in the drivetrain is moreover not particularly favourable.

BRIEF SUMMARY OF THE INVENTION

Against this background, the object of the invention is to specify an improved all-wheel drivetrain for motor vehicles, which is of compact construction, especially in an axial direction, and which has a comparatively low weight.

In the aforementioned all-wheel drivetrain this object is achieved by an all-wheel drivetrain for a motor vehicle, which has at least two driven axles, comprising a characteristic torque converter transmission of longitudinal construction, to the input side of which drive power is fed and which serves for converting a characteristic of a drive engine, and the output side of which is connected to a transfer device, by means of which the drive power can be distributed to the two axles, the characteristic torque converter transmission having an output shaft, which is connected to a first drive shaft for the first axle, and a countershaft parallel thereto, the output shaft and the countershaft being connected to one another by means of a first constant transmission ratio, and the countershaft being connected by means of a second constant transmission ratio to a second drive shaft for the second axle, wherein the transfer device is arranged coaxially with the second drive shaft.

This measure means that the transfer device can be arranged, for example, at the end of the second drive shaft facing the rear axle, in an area where the transfer device does not encroach on the space taken up by the output to the rear axle. It is furthermore possible to integrate the transfer device into the characteristic torque converter transmission.

The characteristic torque converter transmission according to the invention may be a countershaft transmission such as a manual shift transmission, an automated shift transmission, a dual clutch transmission etc. However, the characteristic torque converter transmission may also be an automatic transmission such as a torque converter automatic transmission, a continuously variable transmission (CVT), a toroidal transmission, etc.

The object is therefore achieved in full.

It is particularly advantageous if the transfer device is designed to transmit drive power permanently to the first of the two axles and variably to the second axle by means of a selective engagement clutch, the selective engagement clutch being arranged coaxially with the second drive shaft.

Although the transfer device can generally also take the form of a transfer box, such as a planetary gear train or the like, for example, it is especially preferred if the transfer device is embodied as a selective engagement clutch, which (variably) transmits drive power to the second axle (generally the front axle) as required. In such a transmission the ratio of the drive power transferred to the rear axle and to the front axle may range from 100%:0% to 0%:100%.

In functional terms, such an all-wheel drivetrain corresponds to the all-wheel concept as set out in the ATZ publication cited above.

In the area of the output, a constant transmission ratio is set between the countershaft and the output shaft. A constant transmission ratio is also set between the countershaft and the second drive shaft.

It is therefore particularly advantageous if the characteristic torque converter transmission is embodied as a step-variable transmission of countershaft type, the first constant transmission ratio being formed by a first constant output gear train of the step-variable transmission.

In contrast to conventional step-variable transmissions, which have a constant drive gear train, the first constant output gear train serves to set a first constant transmission ratio between the output shaft and the countershaft, so that the countershaft generally rotates proportionally with the output shaft speed. In this concept, the torques transmitted via the individual gear trains (gear sets) of the various gear steps can be kept lower, so that the individual gear trains can each be of narrower design. Only in the area of the first constant output gear train does a stable bearing support need to be ensured.

According to a further preferred embodiment, the selective engagement clutch has an input member, which is connected to an intermediate shaft, which is concentric with the second drive shaft, and has an output member which is connected to the second drive shaft.

In this way the selective engagement clutch can be designed as a conventional plate clutch, for example, which has an input member and an output member concentric therewith.

It is particularly advantageous here if the intermediate shaft takes the form of a hollow shaft. In this case it is possible to arrange the selective engagement clutch at the axially outermost end of the second drive shaft, so that overall a compact radial construction can be achieved.

It is generally possible to achieve the constant transmission ratio between the countershaft and the second drive shaft by any means, such as a chain drive, for example.

It is especially preferred, however, if the second constant transmission ratio is formed by a second constant output gear train (gear set).

It is especially preferred here if the second constant output gear train comprises at least one beveloid gear, so that the second drive shaft can be arranged obliquely in relation to the countershaft.

This is particularly advantageous when the second drive shaft is intended to run outside a housing of the characteristic torque converter transmission. This furthermore means that the second drive shaft can be connected to a final drive unit for the second axle via only one constant-velocity joint.

It is also advantageous overall if the first and second transmission ratios are a equal size.

In this case the transmission ratios of the final drive units on the two axles can likewise be of equal size.

Where the first and second transmission ratios are different, such a difference in the transmission ratio should be compensated for by different transmission ratio values of the final drive units.

It is furthermore advantageous overall if means for setting the second transmission ratio (such as the second constant output gear train, for example) and/or the transfer device (such as the selective engagement clutch, for example) are accommodated in a housing of the characteristic torque converter transmission.

This allows all components of the drivetrain as far as the two drive shafts to the final drive units to be substantially incorporated in one housing. This affords weight savings. A common oil system can furthermore be provided for the characteristic torque converter transmission and the transfer box.

According to a further preferred embodiment, means for setting the second transmission ratio are accommodated in a cover of the housing of the characteristic torque converter transmission facing the first axle.

This firstly affords ease of assembly and secondly makes it comparatively easy to fit to actuators where the transfer device can be variably controlled (via the amount of slip in the case of a selective engagement clutch or through actuation of a longitudinal locking clutch in the case of a differential-controlled transfer box, for example).

It is furthermore advantageous if actuators for operation of the transfer device are supported on a cover of the housing of the characteristic torque converter transmission facing the first axle.

It is furthermore advantageous if the second drive shaft runs outside a housing of the characteristic torque converter transmission. Here the characteristic torque converter transmission can be designed purely for rear-axle drive, or it can easily be modified for all-wheel drive.

At the same time it is particularly advantageous if the second axle comprises a final drive unit for distributing the drive power to two wheels of the second axle, said unit being connected to the second drive shaft, the final drive unit having a housing separate from the housing of the characteristic torque converter transmission, and the housings being jointly fixed to a chassis of the motor vehicle or to the drivetrain.

This can serve to prevent the external second drive shaft performing excessively large angular movements. In particular, it is possible to avoid axial twist or bend in operation, thereby preventing excessive angular play of the second output shaft.

According to an altogether preferred embodiment, the second drive shaft, at its end assigned to the transfer device, has a circular projection, by means of which the second drive shaft is axially supported in relation to a housing of the transfer device (for example a housing of the characteristic torque converter transmission).

This measure can serve to compensate for any production tolerances, which may cause a variation in the angular position of the second drive shaft.

The second drive shaft or an intermediate shaft connected thereto is preferably furthermore centred with angular freedom of movement by a centering bearing and this too may serve to compensate for production tolerances or to compensate for any angular offset due to the relatively long distance to the front final drive unit.

Overall, in each of the various embodiments, the all-wheel drivetrain according to the invention affords at least one of the following advantages: low weight; compact construction; smaller overall space; few meshing tooth engagements needed to drive the second axle; high efficiency; low mass at the transmission end and low overall weight; drive to the front axle shifted far forwards giving an axially compact construction; shorter drive shaft to the front axle drive; pre-emphasizing of the natural bending frequencies, so that the interval between the resonance frequency and the excitation frequency is increased; few interfaces owing to the absence of a separate transfer box; low maintenance cost and trial cost, since only one drivetrain has to be developed and tried for different variants (rear-wheel drive, all-wheel drive); low logistics and assembly cost; use of the all-wheel concept both for (manual or automated) shift transmission, and for dual clutch transmission; the absence of a separate transfer box means that the prop shaft interface with the rear axle can remain the same for purely rear-wheel drive and for all-wheel drive.

The selective engagement clutch is preferably hydraulically operated; an electromechanical operation is also feasible, however.

Hydraulic operation may be performed by a separate actuator having its own means of generating pressure, for example, or by the use of a pressure source, which is already provided anyway for the operation of an automated, upstream transmission (characteristic torque converter transmission).

It also goes without saying that the selective engagement clutch may be electronically controlled, incorporated into an overriding control strategy for the drivetrain, in order to actively influence the handling, as necessary.

It will be obvious that features specified above and yet to be explained below may be applied not only in the particular combination specified but also in other combinations or individually without departing from the scope of the present invention.

BRIEF DESCRIPTION OF THE SEVERAL VIEWS OF THE DRAWING

Exemplary embodiments of the invention are represented in the drawing and will be explained in more detail in the following description. In the drawing:

FIG. 2 shows a detailed view of an exemplary design for the output section (transfer device) of the drivetrain in FIG. 1;

FIG. 3 shows an alternative embodiment of a drivetrain according to the present invention; and FIG. 4 shows a schematic, perspective view of the rear part of a drivetrain according to the invention, representing the possible connection of a prop shaft and an external shaft obliquely inclined in relation to a front-axle differential.

DETAILED DESCRIPTION OF THE INVENTION

Figure 1:
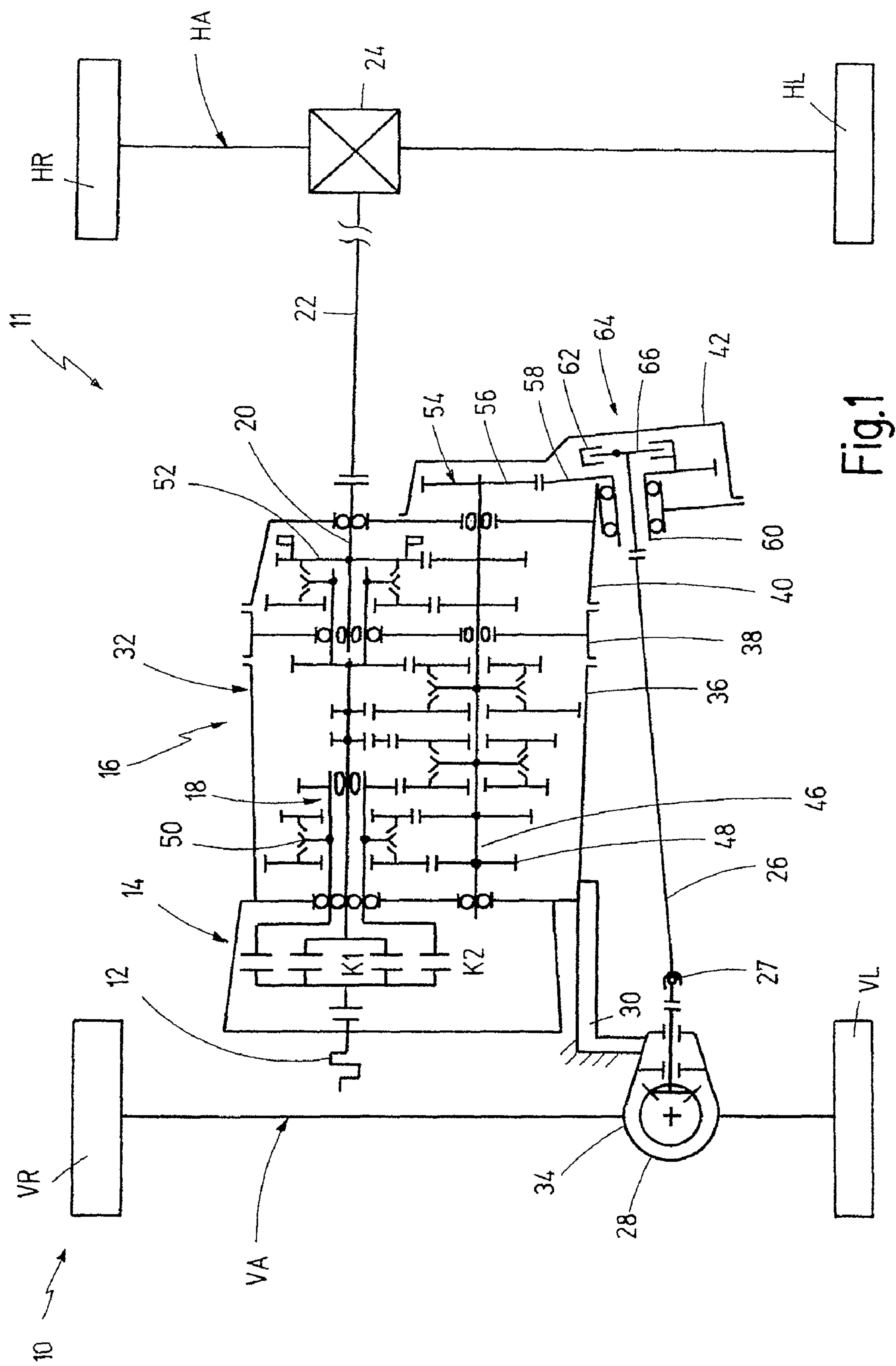
FIG. 1 shows a schematic representation of a motor vehicle with a first embodiment of a drivetrain according to the invention.

In FIG. 1 a motor vehicle with all-wheel drive is generally denoted by 10. The motor vehicle 10 has a front axle VA with front wheels VL, VR and a rear axle HA with rear wheels HL, HR.

The motor vehicle 10 further comprises a drivetrain 11 for driving both axles VA, HA. The drivetrain 11 comprises a drive engine, such as an internal combustion engine 12, a clutch arrangement connected to the drive engine 12 and a step-variable transmission 16 connected to said clutch arrangement.

In this case the step-variable transmission 16 is embodied as a dual clutch transmission, the clutch arrangement 14 comprising a first clutch K1 and a second clutch K2.

The clutches K1, K2 are connected to an input shaft arrangement 18 comprising an inner shaft and a hollow shaft, which are connected to two separate partial transmissions of the step-variable transmission 16. One partial transmission, in a manner known in the art, comprises the even gears and the other partial transmission the odd gears of the step-variable transmission 16.

An output shaft 20 of the step-variable transmission 16 is represented by 20. The step-variable transmission 16 is generally installed longitudinally in the motor vehicle 10 and the output shaft 20 extends to the rear axle and can be connected to a first drive shaft 22 (prop shaft), which drives a rear axle transverse differential 24 for distributing drive torque to the rear wheels HL, HR.

The front axle VA is furthermore driven via a second drive shaft 26, which is connected by way of a constant-velocity joint 27 to a front axle transverse differential 28.

In FIG. 1 a chassis of the motor vehicle is generally denoted by 30. A housing 32 of the step-variable transmission 16 and a housing 34 of the front axle trans-verse differential 28 are jointly fixed to the chassis 30. This affords a comparatively stable angular position between the housing 32 and the housing 34. Axial twists or bends, as would be possible in the case of a free axle carrier, are therefore prevented.

The housing 32 of the step-variable transmission 16 has a housing pan 36, the base of which faces the clutch arrangement 14. The input shaft arrangement 18 passes through the base of the housing pan 36. The housing 32 furthermore has a bearing end plate 38 and a housing cover 40 facing the rear axle HA. An outer cover 42 is furthermore mounted on the housing cover 40. The second drive shaft 26 extends from a radially projecting section of the housing cover 40 towards the front axle VA. The second drive shaft 26 runs outside the housing 32 of the step-variable transmission 16 and runs obliquely with respect to a longitudinal axis of the drivetrain 11, as is defined, for example, by the input shaft arrangement 18 and the output shaft 20.

The step-variable transmission 16 comprises a countershaft parallel to the input shaft arrangement 18, a plurality of gear trains 48 corresponding to various gear steps being supported on the input shaft arrangement 18 and on the countershaft 46, respectively. The gear trains 48 (only one of which in FIG. 1 bears the reference numeral, for reasons of clarity) are connected into the power flow by clutches (for example, synchromesh clutches) known in the art. A corresponding clutch package is represented by 50 in FIG. 1.

The countershaft 46 and the output shaft 20 aligned coaxially with the input shaft arrangement 18, are connected to one another by a first constant output gear train 52. In order words, the countershaft always rotates at a speed proportional to the speed of the output shaft 20.

The countershaft 46 is furthermore connected via a second constant output gear train 54 to an intermediate shaft 60, which is aligned more or less coaxially with the second drive shaft 26. More specifically, the second constant output gear train 54 comprises a first gear wheel 56, which is fixedly connected to the countershaft 46, and a second gear wheel 58. The gear wheels 56, 58 have a beveloid toothing, so that the intermediate shaft 60 can be oriented obliquely to the countershaft 46.

The intermediate shaft 60 is rotatably supported on the housing cover 40 by means of a bearing arrangement, not further identified, and is connected to an input member 62 of a selective engagement clutch 64. The input member 62 is arranged on the side of the second gear wheel 58 facing the rear axle HA and is embodied, for example, as an outer plate carrier. An output member 62 of the selective engagement clutch 64 is formed with an inner plate carrier and is rotatably supported by the intermediate shaft 60, which is embodied as a hollow shaft. The output member 66 is aligned coaxially with and rotationally locked to the second drive shaft 26.

The selective engagement clutch 64 is, for example, normally opened, so that drive power is transmitted solely via the first drive shaft 22 to the rear axle HA. Where drive power is also to be transmitted to the front axle VA, the selective engagement clutch 64 is closed as necessary. With the selective engagement clutch 64 closed, the drive power of the drive engine 12 is distributed to the two axles HA, VA in a ratio of 50%:50%. By controlling the selective engagement clutch 64, the drive power distribution ratio to the two axles HA, VA can accordingly be varied, as necessary.

Arranging the selective engagement clutch 64 coaxially with the second drive shaft 26 saves overall axial space compared to an arrangement of the selective engagement clutch 64 on the countershaft 46. This furthermore means that the position of the output flange to the rear axle HA can be retained unchanged. The separate gear wheel 54 is fixed to the countershaft 46 in order to connect the countershaft 46 to the second drive shaft 26. It is also feasible, however, to achieve the output to the second drive shaft 26 via any of the gear trains 48 of the step-variable transmission, provided that these gear trains have a fixed gear, which is rotationally locked to the countershaft 46 (like the gear train denoted by 48 in FIG. 1, for example).

The beveloid toothing of the gear wheels 56, 58 means that only one constant-velocity joint 27 is needed between the second drive shaft 26 and the front axle transverse differential 28. In this area, too, a tooth engagement with a cross-axes angle in the range ±90° may be provided, so that a constant-velocity joint is no longer necessary in this case.

FIG. 2 shows a design embodiment of the output section of the step-variable transmission 16. In its construction and operating principle the design represented in FIG. 2 corresponds to the schematic arrangement in FIG. 1. The same elements are therefore provided with the same reference numerals. Only the difference will be explored below.

It can be seen from FIG. 2 that the toothing between the gear wheels 56, 58 takes the form of beveloid toothing 70. An angle 72 greater than 0° is thereby established between the countershaft 46 and the second drive shaft 26.

It can further be seen that an outer plate carrier 74, which forms the input member 62, is rotationally fixed to the gear wheel 58.

An actuator arrangement 76 for operation of the selective engagement clutch 64 is arranged on the side of the selective engagement clutch 64 facing the rear axle HA. The actuator arrangement 76 has a piston 77, which is hydraulically operated, for example, and which may be equipped, for example, with a centrifugal force compensating device.

The piston 77 is fixed to a piston carrier 78, which is rotatably supported on the outer cover 42. For controlling the piston 77, the piston carrier 78 is supplied with hydraulic fluid via a rotary bushing 80 of small diameter, which is fixed to the outer cover 42.

A first bearing arrangement is denoted by 82, which serves to support the piston carrier 78. The first bearing arrangement 82 is in this case formed by a single roller bearing. A pressure plate 84, which serves as an axial bearing for the output element 66, in the form of a stub shaft, of the selective engagement clutch 64, is arranged on a side of the piston carrier 78 facing the front axle VA. On this stub shaft, which is rotatably supported inside the intermediate shaft 60, an approximately semi-spherical projection is arranged on the side facing the axial bearing 84 and serves to support the shaft against the axial bearing 84. Varying angular positions of the stub shaft, which can arise due to production tolerances, for example, can thereby be compensated for.

A second bearing arrangement for supporting the intermediate shaft 60 on the housing cover 40 is denoted by 88. The second bearing arrangement 88 is formed by two angular contact ball bearings or taper roller bearings in an O-arrangement, which are tensioned (adjusted) in a defined relationship against one another.

The hydraulic supply for the rotary bushing 80 and hence to the actuator arrangement 76 can be provided by a power-pack system, which is incorporated into the transmission and which comprises an electric motor and pump, for example, or a pump driven by the internal combustion engine.

An external power pack system, which can be flange-mounted onto the housing cover 40 or the outer cover 42, for example, is preferred, however.

FIG. 3 shows an alternative embodiment of a step-variable transmission 16', in which the countershaft 46' and the second drive shaft 26' are formed parallel to on another. Consequently the gear train 54' does not comprise beveloid toothing, but a regular spur gear toothing (helical toothing, for example).

FIG. 4 shows that a compact output design can be obtained with the arrangement shown, in which the selective engagement clutch 64 is coaxial with the second drive shaft 26. The outer cover 42 is arranged radially relatively close to the output shaft 20, but does not interfere therewith, so that an axially compact construction can be achieved. An electro-hydraulic actuator control 90 in the form of an electric motor with a hydraulic pump and with a control unit 92 can also be fitted to the outside of the housing cover 40, without any significant change in the package size of the assembly.

A pump for generating pressure is here preferably driven by an electric motor and is preferably embodied as a screw pump. The required pressure can then preferably be set directly by controlling the electric motor. This saves the need for hydraulic valves to control the pressure.

The clutch arrangement 14 preferably has two wet plate clutches K1, K2, although the clutches K1, K2 may also take the form of dry separating clutches. In the case of wet plate clutches, a good prerequisite for functional integration of the transfer device is created in the form of the hydraulically operated selective engagement clutch. An existing hydraulic and/or electronic module may be used. The selective engagement clutch 64 may be controlled by the transmission control module, for example.

The second drive shaft 26 may be connected to the stub shaft of the output member 66 via a plug profile, for example.

Instead of using a beveloid stage for the gear train 54 in FIG. 1, a conventional gear train may also be used, in which case a constant-velocity joint, for example, is then provided in the area of the stub shaft 66.

The output member 66, as is shown, in particular, in FIG. 2, is supported with angular freedom of movement in a centering 95. In order to ensure freedom of movement, the output member 66 furthermore has a certain play in relation to the inner plates of the selective engagement clutch 64, for example by creating a greater tooth backlash in a connection to the inner plates via a splined shaft profile. A seal 96 with an increased radial mobility is furthermore arranged between the output member 66 and the hollow shaft 60.

What is claimed is:

1. All-wheel drivetrain for a motor vehicle, which has at least two driven axles, comprising a characteristic torque converter transmission of longitudinal construction, to the input side of which drive power is fed and which serves for converting a characteristic of a drive engine, and the output side of which is connected to a transfer device, by means of which the drive power can be distributed to the two axles, the characteristic torque converter transmission having an output shaft which is connected to a first drive shaft for the first axle, and a countershaft parallel thereto, the output shaft and the countershaft being connected to one another by means of a first constant transmission ratio, and the countershaft being connected by means of a second constant transmission ratio to a second drive shaft for the second axle, wherein the transfer device is arranged coaxially with the second drive shaft, wherein the transfer device is designed to transmit drive power permanently to the first of the two axles and variably to the second axle by means of a selective engagement clutch, the selective engagement clutch being arranged coaxially with the second drive shaft, and wherein the selective engagement clutch has an input member which is connected to an intermediate shaft which is concentric with the second drive shaft, and has an output member which is connected to the second drive shaft.

2. All-wheel drivetrain according to claim 1, wherein the characteristic torque converter transmission is embodied as a step-variable transmission of countershaft type, the first constant transmission ratio being formed by a first constant output gear train of the step-variable transmission.

3. All-wheel drivetrain according to claim 1, wherein the intermediate shaft takes the form of a hollow shaft.

4. All-wheel drivetrain according to claim 1, wherein the second constant transmission ratio is formed by a second constant output gear train.

5. All-wheel drivetrain according to claim 4, wherein the second constant output gear train comprises at least one beveloid gear, so that the second drive shaft can be arranged obliquely in relation to the countershaft.

6. All-wheel drivetrain according to claim 1, wherein the first and second transmission ratios are of equal size.

7. All-wheel drivetrain according to claim 1, wherein at least one of components for establishing the second transmission ratio and the transfer device are accommodated in a housing of the characteristic torque converter transmission.

8. All-wheel drivetrain according to claim 7, wherein components for establishing the second transmission ratio are accommodated in a cover of the housing of the characteristic torque converter transmission facing the first axle.

9. All-wheel drivetrain according to claim 1, wherein the second drive shaft or an intermediate shaft connected thereto, at its end assigned to the transfer device, has a circular projection, by means of which the second drive shaft is axially supported in relation to a housing of the transfer device.

10. All-wheel drivetrain according to claim 1, wherein the second drive shaft or an intermediate shaft connected thereto is centred with angular freedom of movement by a centring bearing.

11. All-wheel drivetrain for a motor vehicle, which has at least two driven axles, comprising a characteristic torque converter transmission of longitudinal construction, to the input side of which drive power is fed and which serves for converting a characteristic of a drive engine, and the output side of which is connected to a transfer device, by means of which the drive power can be distributed to the two axles, the characteristic torque converter transmission having an output shaft which is connected to a first drive shaft for the first axle, and a countershaft parallel thereto, the output shaft and the countershaft being connected to one another by means of a first constant transmission ratio, and the countershaft being connected by means of a second constant transmission ratio to a second drive shaft for the second axle, wherein the transfer device is arranged coaxially with the second drive shaft, wherein actuators for actuating the transfer device are supported on a cover of a housing of the characteristic torque converter transmission facing the first axle.

12. All-wheel drivetrain for a motor vehicle, which has at least two driven axles, comprising a characteristic torque converter transmission of longitudinal construction, to the input side of which drive power is fed and which serves for converting a characteristic of a drive engine, and the output side of which is connected to a transfer device, by means of which the drive power can be distributed to the two axles, the characteristic torque converter transmission having an output shaft which is connected to a first drive shaft for the first axle, and a countershaft parallel thereto, the output shaft and the countershaft being connected to one another by means of a first constant transmission ratio, and the countershaft being connected by means of a second constant transmission ratio to a second drive shaft for the second axle, wherein the transfer device is arranged coaxially with the second drive shaft, wherein the second drive shaft runs outside a housing of the characteristic torque converter transmission.

13. All-wheel drivetrain according to claim 12, wherein the second axle comprises a transverse differential for distributing the drive power to two wheels of the second axle which is connected to the second drive shaft, the transverse differential having a housing separate from the housing of the characteristic torque converter transmission, and the housings being jointly fixed to a chassis of the motor vehicle.

* * * * *